United States Patent Office 3,036,072
Patented May 22, 1962

3,036,072
MORPHOLINE DERIVATIVE OF THIO-DISALICYLIC ACID
Charles F. Geschickter, Kensington, Md., assignor to The Geschickter Fund for Medical Research, Inc., Washington, D.C., a corporation of New York
No Drawing. Filed Sept. 14, 1960, Ser. No. 55,867
1 Claim. (Cl. 260—247.1)

The present invention relates to a therapeutic compound and more particularly to a diphenolic.

One of the objects of the present invention is to provide a novel nitrogen derivative of a diphenolic sulfur compound.

It is another important object of the present invention to provide a novel therapeutic compound useful in the treatment of arthritis.

It is a still further object of the present invention to provide a novel morpholine derivative of thio-disalicylic acid.

These and other objects and advantages of the present invention will appear more fully in the following specification and appended claim.

The present invention is directed to the morpholine Mannich derivative of thio-disalicylic acid, having the following structural formula:

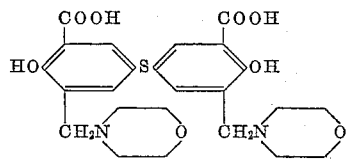

This compound may be prepared, utilizing the well-known Mannich reaction, as follows:

12.2 g. (.04 mole) of thio-disalicylic acid was dissolved in 30 cc. of absolute methanol, 8.7 g. (.10 mole) of morpholine was added and the solution was cooled. Aqueous HCHO (9.0 g., 0.10 mole) was then added slowly over a period of 15 minutes to the cold solution in a 250 ml. round bottom flask. After being permitted to stand 1 hr. at room temperature, the flask was attached to a reflux condenser and boiled on a water bath for a period of between four and five hours. The excess alcohol and other liquids present were removed by distillation at reduced pressure, leaving a dark brown residue which was then taken up in about 100 cc. of distilled water and filtered. The brown filtrate was then poured slowly with constant stirring into a large volume of water whose pH was from 2 to 3. About 20 cc. of the above filtrate was poured into 200 cc. of water at one time and the tan, "muddy" precipitate was filtered by suction on a sintered glass funnel. The pasty residue or precipitate was then washed again in another vessel with water of a pH of about 3 and filtered again as before. Finally, the precipitate was washed rapidly with 25–50 cc. of pure distilled water and allowed to dry on a watch glass at room temperature. These washings were continued until all of the product was precipitated in water of pH 2 to 3. A tan powder was obtained as a product which decomposes at a temperature above 200° C. The product may be solvated to some extent. No satisfactory recrystallizing solvent was found.

The compound of the present invention has been found to be particularly useful in the treatment of rheumatoid- and osteoarthritis. It has an acute toxicity, as determined in tests on rats, of 800 mg./kilo. In capsule or tablet form it may be administered orally in dosages of 300 mg., three times daily. Alternatively, the compound may be injected intramuscularly in a dosage of 1 cc. per day in the form of an aqueous solution containing 100 mg./cc. adjusted approximately to pH 7.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

The compound having the following formula:

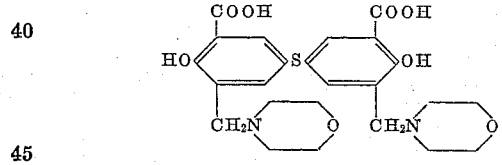

No references cited.